(12) United States Patent
Tu et al.

(10) Patent No.: US 7,447,359 B2
(45) Date of Patent: Nov. 4, 2008

(54) SYSTEM AND METHOD FOR ANATOMICAL STRUCTURE PARSING AND DETECTION

(75) Inventors: Zhuowen Tu, San Diego, CA (US); Xiang Zhou, Exton, PA (US); Dorin Comaniciu, Princeton Junction, NJ (US); Christian P. Schultz, Beverly, MA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 676 days.

(21) Appl. No.: 11/219,487

(22) Filed: Sep. 2, 2005

(65) Prior Publication Data

US 2006/0050960 A1   Mar. 9, 2006

Related U.S. Application Data

(60) Provisional application No. 60/607,566, filed on Sep. 7, 2004.

(51) Int. Cl.
*G06K 9/00* (2006.01)
(52) U.S. Cl. ..................................... 382/173
(58) Field of Classification Search ......... 382/155–160, 382/164–165, 173, 177–179, 181, 190, 192, 382/218, 224–228; 706/12, 15–16; 715/723
See application file for complete search history.

(56) References Cited

U.S. PATENT DOCUMENTS 6,320,976 B1   11/2001   Murthy et al.

2005/0147303 A1   7/2005   Zhou et al.

FOREIGN PATENT DOCUMENTS

WO   WO 2004/044845   5/2004

OTHER PUBLICATIONS

Zhuowen Tu, et al., "Image Parsing: Unifying Segmentation, Detection, and Recognition" *Proceedings of the Ninth IEEE International Conference on Computer Vision (ICCV 2003) 2-Volume Set.*
Zhuowen Tu, et al. Image Segmentation by Data-Driven Markov Chain Monte Carlo, pp. 657-673, *IEEE Transactions On Pattern Analysis and Machine Intelligence*, vol. 24, No. 5, May 2002.
Tu Z et al. "Image Segmentation by Data-Driven Markov Chain Monte Carlo," *IEEE Transactions on Pattern Analysis and Machine Intelligence, IEEE Service Center, Los Alamitos, CA, US,* (2002) vol. 5:24 pp. 657-673 XP001141190 ISSN: 0162-8828.

(Continued)

*Primary Examiner*—Jose L Couso

(57) ABSTRACT

A method for segmenting a digitized image includes providing a digitized image comprising a plurality of intensities defined on a lattice of pixels, initializing a Bayesian prior probability and likelihood function for segmenting said image, decomposing said image into a union of a plurality of subspaces wherein each subspace is a product of k-partitions, and distributing a plurality Bayesian posterior probability functions over said subspaces, updating said Bayesian posterior probability functions via a data-driven Markov-chain, and selecting a subset of said Bayesian posterior probability functions that approximate a true Bayesian posterior probability function.

23 Claims, 4 Drawing Sheets

OTHER PUBLICATIONS

Zhuowen Tu et al,, "Image parsing: unifying segmentation, detection, and recognition," *Proceedings of the Eight IEEE International Conference on Computer Vision*, (2003) vol. 2 pp. 18-25 XP010662237 ISBN: 0-7695-19590-4.

Viola p et al., "Rapid object detection using a boosted cascade of simple features," *Proceedings 2001 IEEE Conference on Computer Vision and Pattern Recognition*, (2001) vol. 1 pp. 511-518, XP010583787 ISBN: 0-7695-1272-0.

Lienhart R et al., "An extended set of Haar-like features for rapid object detection," *Proceedings 2002 International Conference on Image Processing*, (2002) vol. 2 pp. 900-903 XP010607470 ISBN: 0-7803-7622-6.

Belongie S et al., "Finding boundaries in natural images: a new method using point descriptors and area completion," *Computer Vision*, (1998) vol. 1 pp. 751-766 XP007900294 ISBN: 3-540-64569-1.

Andrieu C et al., "An introduction to MCM for machine learning," *Machine Learning Kluwer Academic Publishers Netherlands*, (2003) vol. 50:1-2 pp. 5-43 XP007900280 ISSN: 0885-6125.

International Search Report.

(a) An example of 3D MRI data.

(b) Vessel trees and lymph nodes.

(c) Kidney.

(d) Bones

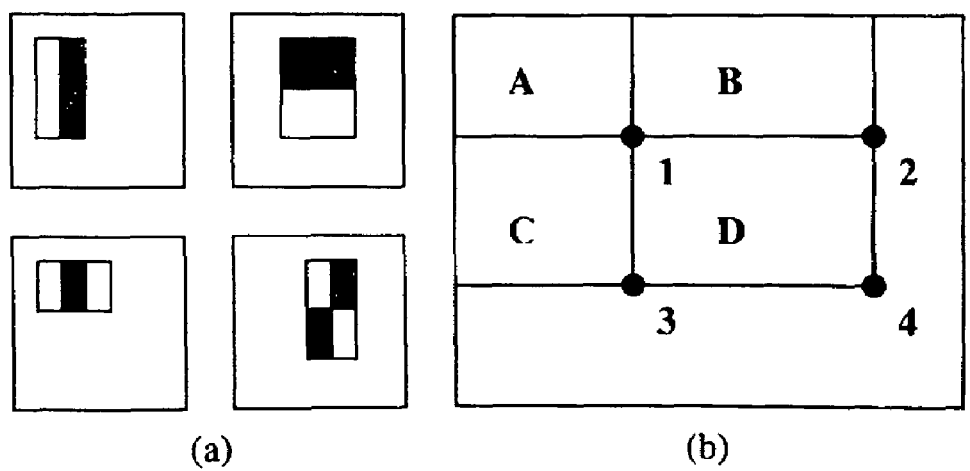
FIG. 5     (a)     (b)

SYSTEM AND METHOD FOR ANATOMICAL STRUCTURE PARSING AND DETECTION

CROSS REFERENCE TO RELATED UNITED STATES APPLICATIONS

This application claims priority from "Anatomical Structure Parsing and Lymph-node detection in MRI", U.S. Provisional Application No. 60/607,566 of Tu, et al., filed Sep. 7, 2004, the contents of which are incorporated herein by reference.

TECHNICAL FIELD

This invention is directed to parsing, detecting and recognizing biological structures from images taken under different modalities.

DISCUSSION OF THE RELATED ART

Image segmentation is a long standing and challenging topic in computer vision. One challenge is the fundamental complexity of modeling the vast amount of visual patterns that appear in generic images. The objective of image segmentation is to parse an image into its constituent components. The latter are various stochastic processes, such as attributed points, lines, curves, textures, lighting variations, and deformable objects. Thus, a segmentation algorithm should incorporate many families of image models, and its performance is bounded by the accuracy of its image models.

Another challenge involves the intrinsic ambiguities of image perception, especially when there is no specific task to guide attention. Real world images are fundamentally ambiguous, and our perception of an image changes over time. Furthermore, an image often demonstrates details at multiple scales. Thus, the more one looks at an image, the more one sees. Therefore, a segmentation algorithm need not output only one result. Image segmentation should output multiple distinct solutions dynamically and endlessly to best preserve these intrinsic ambiguities.

Image segmentation can be combined with detection and recognition of objects and text. These three tasks have been considered separately, and there is no commonly accepted framework of combining segmentation with detection and recognition. One example of an application where an integrated approach is useful is the detection and recognition of lymph nodes, which have flexible boundaries. There have been limited efforts made for segmenting and detecting lymph nodes in MRI or CT images. Previous attempts rely mostly on manual initialization followed by foreground and background segmentation with no contextual information being used. In addition, despite extensive research literature for segmentation in medical imaging, there has been no unified framework fro segmentation and recognition of lymph nodes, and current approaches rely on simple assumptions.

SUMMARY OF THE INVENTION

Exemplary embodiments of the invention as described herein generally include methods and systems for anatomical structure parsing, in which 3D magnetic resonance (MRI) and computed tomography (CT) images are decomposed into anatomical structures in which contextual information can be taken into account.

According to an aspect of the invention, there is provided a method for segmenting a digitized image including the steps of providing a digitized image comprising a plurality of intensities defined on a lattice of pixels, initializing a Bayesian prior probability and likelihood function for segmenting said image, decomposing said image into a union of a plurality of subspaces wherein each subspace is a product of k-partitions, and distributing a plurality Bayesian posterior probability functions over said subspaces, updating said Bayesian posterior probability functions via a data-driven Markov-chain, and selecting a subset of said Bayesian posterior probability functions that approximate a true Bayesian posterior probability function.

According to a further aspect of the invention, updating said Bayesian posterior probability functions further comprises sampling moves from a proposal probability and accepting moves based on a proposal likelihood probability function.

According to a further aspect of the invention, the Markov-chain comprises jump moves and diffusion processes.

According to a further aspect of the invention, the data-driven Markov-chain combines bottom-up proposals and top-down generative models to guide the updating of the posterior probability function.

According to a further aspect of the invention, the bottom proposals are derived from an AdaBoost classifier algorithm.

According to a further aspect of the invention, the AdaBoost algorithm outputs a conditional probability.

According to a further aspect of the invention, the generative models are based on models using parameters estimated from training said AdaBoost classifiers.

According to a further aspect of the invention, the method further comprising computing an integral volume from said image to compute Haar type features.

According to a further aspect of the invention, the AdaBoost classifier uses DOG and DOOG filters to define features.

According to a further aspect of the invention, the method further comprising using an occlusion mask to correct a feature value for an occluded feature, wherein said occlusion mask excludes invalid pixels from a feature value calculation.

BRIEF DESCRIPTION OF THE DRAWINGS

FIG. 5(a) illustrates an exemplary rectangle feature, while FIG. 5(b) illustrates the computation of rectangle sum, according to an embodiment of the invention.

DETAILED DESCRIPTION OF THE PREFERRED EMBODIMENTS

Figure 1:
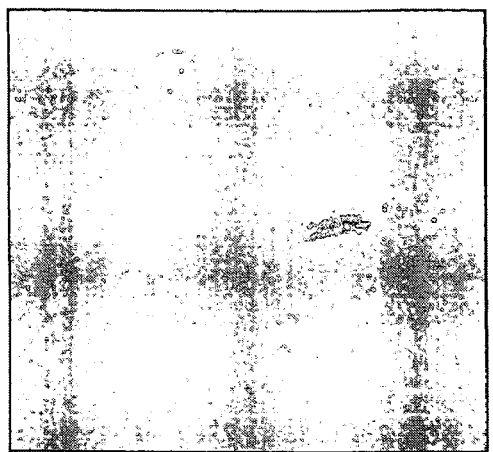
FIGS. 1(a)-(d) illustrate anatomical structure parsing scheme, according to an embodiment of the invention.
Figure 1:
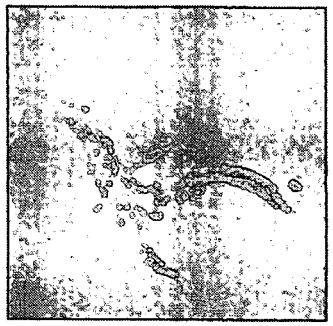
Figure 1:
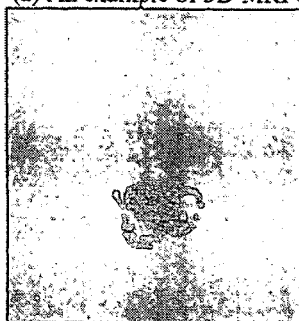
Figure 1:
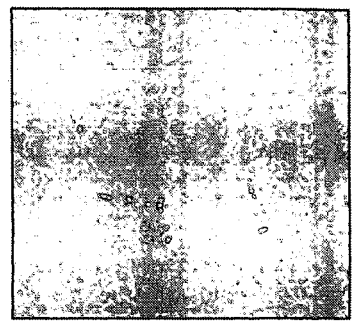

Exemplary embodiments of the invention as described herein generally include systems and methods for a general scheme for the automatic segmentation, detection and recognition of biological structures in different imaging modalities. A general framework for anatomical structure parsing for segmenting and decomposing structures in MRI/CT data utilizes a data-driven Markov-chain Monte Carlo scheme to combine bottom-up and top-down information in a principled way. The anatomical structures are learned and described by generative models. Information regarding different features and obtained in different modalities can be analyzed in this general framework. A new Ada-boost method uses filters such as DOG (difference of gaussians) and DOOG (difference of offset gaussians) as a set of features to account for the blob-like shape of lymph nodes. Methods developed for detecting objects under known occlusions are also be used to deal with lymph-nodes close to the vessel trees. Features for flexible shapes are determined by computing an integral image volume using Haar type features. The computational complexity of computing each feature is fixed regardless of the size of each feature, as only the corners need to be known. Candidate lymph nodes are detected by boosting methods, which take into account contextual information such as vessel trees. A top-down procedure with generative models is used to further segment the lymph nodes.

An exemplary, non-limiting image can be represented as a function I defined on a lattice $\Lambda=\{(i,j,k): 1 \leq i \leq L; 1 \leq j \leq H; 1 \leq k \leq D\}$ where for any pixel/point $v \in \Lambda$, $I_v \in \{0, \ldots, G\}$ is the pixel intensity. Image segmentation refers to portioning the lattice into an unknown number of K disjoint regions $$\Lambda = \cup_{i=1}^{K} R_i, \; R_i \cap R_j = \{\}, \; \forall i \neq j.$$

Each region $R \subset \Lambda$ need not be connected due to occlusion. The boundary of region $R_i$ is denoted by $\Gamma_i = \partial R_i$. Each image region $I_R$ should be coherent in the sense that IR is a realization of a probabilistic model $p(I_R, \Theta)$ where $\Theta$ represents a stochastic process or intensity model whose type is indexed by $\iota$. Thus, segmentation is represented by a vector of hidden variables W, which describe the world state for generating the image I. In the exemplary case where the image comprises data derived form a biological organism, such as a section of a human body, the regions correspond to structures or objects within the organism that are sought to be detected and identified. The term object and regions will be used interchangeably within this disclosure.

Image parsing seeks to represent an input image by the parameters of the generative models that best describe it together with the boundaries of the regions and objects. The generative models should generate raw image intensities to directly compare different models. A non-limiting example according to an embodiment of the invention is an inference problem in which input is a set of data taken under different modalities, such as MRI and CT. An exemplary set of such data can be denoted as $\{V_1, V_2, \ldots, V_n\}$, and the anatomical interpretation of this data can be denoted as $W=(n, \{O_1, \ldots, O_n\})$, where n is the number of structures and $O_i$ denotes each structure. The problem can be formulated in a Bayesian framework and the goal is to look for the optimal $W^*=\arg\max p(W|(V_1, \ldots, V_n)) \propto p(V_1, \ldots, V_n|W)p(W)$ that maximizes the a posteriori probability over a set of solutions W. The likelihood $p(V_1, \ldots, V_n|W)$ specifies the image generating processes from W to $(V_1, \ldots, V_n)$ and the prior probability $p(W)$ represent the prior knowledge of the world. The prior $p(W)$ can be written as $p(W)=p(N)\Pi_i^N p(V_i)$, while the likelihood function can be written as $p(V_1, \ldots, V_n|W) = \Pi_i^N p(V_i; \theta_i, \iota_i)$ for some parameter $\theta_i$ for an intensity model indexed by $\iota$.

FIGS. 1(a)-(d) illustrate an exemplary anatomical structure parsing scheme in which input MRI data is parsed into different anatomical structures of interest. FIG. 1(a) illustrates an example of 3D MRI data, FIG. 1(b) depicts vessel trees and lymph nodes, FIG. 1(c) depicts a kidney, while FIG. 1(d) depicts bones.

The Bayesian most probable interpretation W* can be estimated by a data-driven Markov-chain Monte Carlo (DDMCMC) algorithm. This method, a version of the Metropolis-Hastings algorithm, uses different types of image models to compete to explain various visual patterns in an image. The image solution space is decomposed into a union of subspaces of varying dimensions, where each subspace is a product of a number of subspaces for the image partition and image models. Ergodic Markov chains are used to explore the solution space and to sample the posterior probability. The Markov chain includes two types of dynamics: jumps and diffusion. Jumps simulate reversible split-and-merge and model switching, while diffusion simulates boundary deformation, region growing, region competition, and model adaptation. Data driven techniques are used to guide the Markov chain search, including edge detection and tracing and data clustering. The results of these methods are expressed as weighted samples which encode non-parametric probabilities in various subspaces. These probabilities approximate the marginal probabilities of the Bayesian posterior probability and are used to design importance proposal probabilities to drive the Markov chains. Finally, a set of important and distinct solutions are selected and pruned from the Markov chain sequence at multiple scales of detail. The set of solutions encode an approximation to the Bayesian posterior probability. The multiple solutions are computed to minimize a Kullback-Leibler divergence from the approximate posterior to the true posterior and preserve the ambiguities of the image segmentation.

More specifically, the DDMCMC employs data-driven bottom-up proposals $q(W \mapsto W'|(V_1, \ldots, V_n))$ to drive the convergence of topdown generative models. Moves are selected by sampling from a proposal probability $q(W \mapsto W'|(V_1, \ldots, V_n))$ and they are accepted by determining proposal likelihood probability $\alpha(W \mapsto W')$:

$$\alpha(W \to W') = \min\left(1, \frac{p(W'|(V_1, \ldots, V_n))}{p(W|(V_1, \ldots, V_n))} \cdot \frac{q(W' \mapsto W|(V_1, \ldots, V_n))}{q(W \mapsto W'|(V_1, \ldots, V_n))}\right).$$

As previously stated, these moves can be subdivided into two basic types, jumps which realize moves between different dimensions, and diffusion which realizes moves within fixed dimension. Jump moves are discrete and correspond to the birth/death of region hypotheses, splitting and merging of regions, and switching the model for a region, etc. Diffusion processes correspond to continuous changes such as altering the boundary shape of a region, and changing the parameters of a model used to describe a region. The DDMCMC algorithm is described in detail in Tu, et al., "Image Segmentation by Data-Driven Markov Chain Monte Carlo", IEEE Transactions on Pattern Analysis and Machine Intelligence, Vol. 24, No. 5, pp. 657-673, (2002), the contents of which are incorporated herein by reference in their entirety.

Examples of the top-down generative models include techniques such as Principle Component Analysis and the use of deformable templates that model the basic shapes of the anatomical structures of interest. The bottom-up proposals are learned by a probabilistic version of the AdaBoost algorithm. Standard AdaBoost learns a strong classifier $H_{Ada}(I)$ by combining a set of T weak classifiers $\{h_t(I)\}$ using a set of weights $\{\alpha_t\}$:

$$H_{Ada}(I) = \text{sign}\left(\sum_{t=1}^{T} \alpha_t h_t(I)\right),$$

where the selection of features $h_t(I)$ and weights $\alpha_t$ are learned through supervised training off-line. Given a set $\{x_i, y_i\}$ for $i=1, \ldots, m$, the procedure involves initializing a set of weights $D_i(t)$, and seeking a set of weak classifiers with a minimum error with respect to the distribution $D(t)$. A coefficient $\alpha_t$ is selected at each step that maximizes a normalization factor, and the distribution $D(t)$ is updated according to the new coefficient and weak classifier. The output is a final classifier that is a sum of the weak classifiers weighted by the coefficients.

The probabilistic variant of AdaBoost outputs conditional probabilities and is based on the fact that an AdaBoost algorithm that has been trained on data from two classes A, B converges, in probability, to estimates of the conditional distributions $q(A|I)$, $q(B|I)$ of the data I:

$$\frac{\exp\left(\sum_{t=1}^{T} \alpha_t h_t(I)\right)}{\exp\left(\sum_{t=1}^{T} \alpha_t h_t(I)\right) + \exp\left(-\sum_{t=1}^{T} \alpha_t h_t(I)\right)} \mapsto q(A|I)$$

$$\frac{\exp\left(-\sum_{t=1}^{T} \alpha_t h_t(I)\right)}{\exp\left(\sum_{t=1}^{T} \alpha_t h_t(I)\right) + \exp\left(-\sum_{t=1}^{T} \alpha_t h_t(I)\right)} \mapsto q(B|I)$$

The AdaBoost technique learns these conditional probability distributions and activates the generative models, avoiding premature decisions regarding the presence or absence of a structure.

Figure 4:
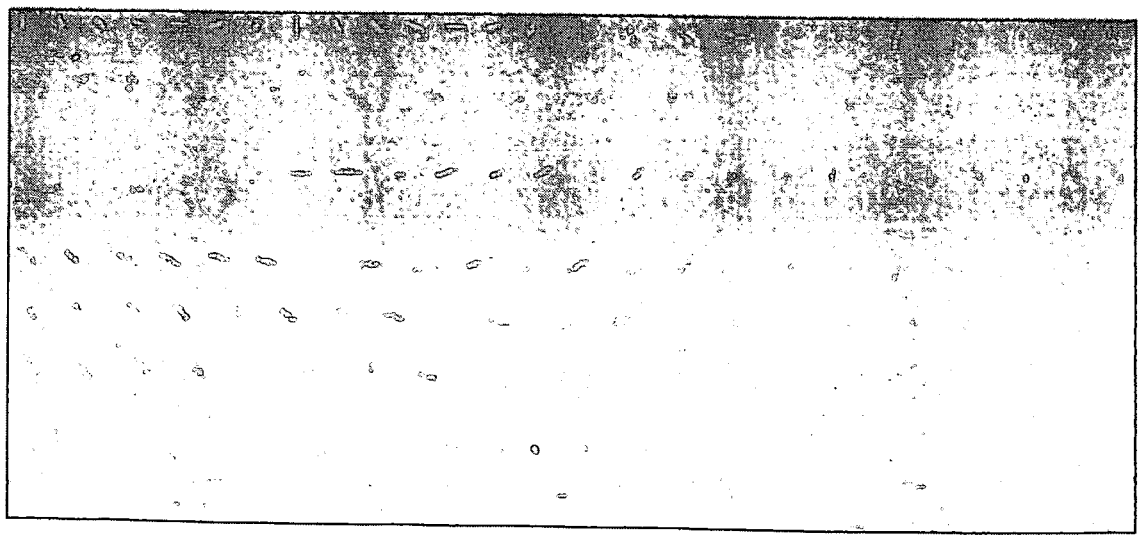
FIG. 4. depicts examples of the shapes that can be modeled by DOG and DOOG filters used for AdaBoost training, according to an embodiment of the invention.

Structures such as lymph nodes, which have flexible boundaries, present challenges for classification by AdaBoost methods. According to an embodiment of the invention, filters such as DOG (difference of Gaussians) and DOOG (difference of offset Gaussians) are used as features in the training phase of the AdaBoost classifiers to account for the blob-like shape of lymph nodes. An example of the shapes that can be modeled by DOG and DOOG filters are depicted in FIG. 4. According to a further embodiment of the invention, features are represented by Haar basis functions. The computational complexity of computing each feature is fixed regardless the size of the features, since one needs only to know the corners of the features. This improves the computational efficiency of computing the features. According to another embodiment of the invention, the performance of the AdaBoost method can be further enhanced by combining AdaBoost classifiers in a cascade using asymmetric weighting to form a stronger classifier, to enable the computational resources to concentrate on image regions where the conditional probabilities are non-negligible. These combined classifiers take into account contextual information, such as blood vessel trees.

According to an embodiment of the invention, once the AdaBoost classifiers have been trained to generate estimates of the conditional distributions, and the generative models have been defined, Markov-chains are used to simulate random walks in the solution space. The interactions between objects and their model parameters are governed by partial differential equations for the boundary and template deformation. The PDEs are derived as greedy steps for minimizing the energy functions (or minus log-posterior probability) through variational calculus. For a boundary whose left and right components are objects, its motion equation has three energy terms for object $O_i$: one for the likelihood, and two for the priors on volume and boundary, based on the assumption that $p(O_i) \propto \exp(-\gamma|O_i|^{\alpha} - \lambda|\partial O_i|)$, that is, the prior for $O_i$ has an volume term and a boundary term:

$$E(O_i) = \int\int_{R_i} -\log p(I(x,y,z)|\theta_{l_i})dxdydz + \gamma|O_i|^{\alpha} + \lambda|\partial O_i|.$$

The equation of motion can be obtained from the variational derivative of this equation.

Structural changes in the solution W are realized by Markov-chain jumps. These jumps include reversible jumps between two objects and model switching: $\theta_1 \leftrightarrow \theta_2$, and the splitting or merging of an object: $(O_k) \leftrightarrow (O_i, O_j)$. The Markov-chain selects one of the above moves at each step, triggered by bottom-up compatibility conditions.

The above methods do not address the detection of lymph nodes when they are partially occluded by adjacent objects, such as vessel trees. A technique to eliminate the influence of known occlusions in the object detection process can be illustrated in terms of simple features used for weak classifiers, such as the rectangle features illustrated in FIG. 5($a$). These rectangle features are similar to Haar basis functions and provide a rich image representation for object detection. The value of a rectangle feature is the difference between the sums of pixels intensity in the white (positive) and gray (negative) regions. The regions are adjacent and have same shape and size. Rectangle features provide an overcomplete basis, for example for a base region size of 24×24 pixels the number of features is 180,000. One of the advantages of rectangle features is computational speed. By using an intermediate representation known as the "integral image", a feature value can be calculated through a fixed number of operations (for example a two-rectangle feature requires six array references). The integral image II contains at location $(x_0; y_0)$ the sum of intensities of the pixels above and to the left:

$$II(x_0, y_0) = \sum_{x \leq x_0, y \leq y_0} I(x, y)$$

where $I(x; y)$ is the intensity of the pixel at location $(x; y)$. The integral image can be computed in one pass over the input image. FIG. 5($a$) illustrates an exemplary rectangle feature, while FIG. 5($b$) illustrates the computation of rectangle sum. The computation of the sum for rectangle D is the value of the integral image at locations 4 (which is A+B+C+D)+location 1 (which is A)−location 2 (B+A)−location 3 (C+A).

An invalid intensity value for a pixel resulting from an occlusion will yield an incorrect estimate for the feature using that pixel. Methods for correcting for an occluded pixel are disclosed in U.S. Patent Application Publication No. 2005/0147303, "System and method for detecting and matching anatomical structures using appearance and shape" of Zhou, et al., filed Nov. 18, 2004, the contents of which are incorporated herein by reference in their entirety. A method therein disclosed is summarized in the remainder of this paragraph. If an occlusion mask is available, it can be used to eliminate the contribution of the invalid pixels to the feature value. The mask is available when images are taken in controlled environments or it can be inferred from the data (for example in surveillance applications the static background is known, in ultrasound images the fan location can be computed or analysis of time variations can yield the static regions). If the intensity for the invalid pixels is set to zero, the rectangle sum will no longer be influenced by incorrect values. However due to the missing data the sum will be "unbalanced". If there are no missing values, the rectangle sum is proportional to the mean intensity value, therefore it can approximate the mean value if the number of valid intensities (when occlusions are present) is known. The number of valid pixels can be easily found by first computing an equivalent map: the "integral mask". Given the valid pixels mask M with boolean values (1 for valid pixel, 0 for invalid or occluded pixel), then the integral mask IM contains the number of valid pixels above and to the left of the current location:

$$IM(x_0, y_0) = \sum_{x \leq x_0, y \leq y_0} M(x, y).$$

Similarly to the integral image, the number of valid pixels in a rectangle can be computed from the integral mask in the same number of operations. The equivalent feature value will be given by a weighted difference between the sum of the intensities in the "positive" and "negative" image regions. If we denote by $R_+$ the region where the pixels intensities contribute with a positive value and by $R_-$ with a negative value, the feature value $f$ is $$f = \frac{n_-}{N} \sum_{(x,y) \in R_+} I(x, y) - \frac{n_+}{N} \sum_{(x,y) \in R_-} I(x, y)$$

where $n_-$, $n_+$ denote the number of valid pixels for negative and positive regions respectively, each containing N pixels.

The solution space $\Omega$ over which the posterior probability is distributed has a structure that can be understood by considering a partition space of all possible partitions of the image lattice $\Lambda$. When a lattice $\Lambda$ is segmented into k disjoint regions, the segmentation is referred to as a k-partition, denoted by $\pi_k$:

$$\pi_k = (R_1, \ldots, R_k), \cup_{i=1}^k R_i = \Lambda, R_i \cap R_j = \{\ \}, \forall i \neq j.$$

If all pixels in each region are connected, then $\pi_k$ is a connected component partition. The set of all k-partitions, denoted by $\overline{\omega}_{\pi_k}$ is a quotient space of the set of all possible k-colorings divided by a permutation group PG for the labels:

$$\overline{\omega}_{\pi_k} = \{(R_1, \ldots, R_k) = \pi_k; |R_i| > 0, \forall i=1, \ldots, k\}/PG.$$

Thus, there exists a general partition space $\overline{\omega}_\pi$ with the number of regions $1 \leq k \leq |\Lambda|$, $$\overline{\omega}_\pi = \cup_{k=1}^{|\Lambda|} \overline{\omega}_{\pi_k}.$$

Then, the solution space for W is a union of subspaces $\Omega_k$ and each $\Omega_k$ is a product of one k-partition space $\overline{\omega}_{\pi_k}$ and k spaces for image models.

According to an embodiment of the invention, the K weighted solutions computed by the Markov-chains are represented as $S = \{(w_i, W_i): i=1, \ldots K\}$ where the weight is the posterior probability, $w_i = p(W|(V_1, \ldots, V_n))$, $i=1, \ldots, K$. S encodes a non-parametric probability in $\Omega$, $$\hat{p}(W | (V_1, \ldots, V_n)) = \sum_{i=1}^K \frac{w_i}{w} G(W - W_i), \quad \sum_{i=1}^K w_i = w,$$

where G is a Gaussian window in $\Omega$. As all image ambiguities are captured in the Bayesian posterior probability to reflect intrinsic ambiguities, the set of solutions which best preserves the posterior probability should be computed. This can be performed by allowing $\hat{p}(W|(V_1, \ldots, V_n))$ approach $p(W|(V_1, \ldots, V_n))$ by minimizing a Kullback-Leibler (KL) divergence $D(p\|\hat{p})$ under a complexity constraint $|S|=K$, $$S^* = \underset{|S|=K}{\arg\min} D(p \| \hat{p})$$

$$= \underset{|S|=K}{\arg\min} \int p(W | (V_1, \ldots, V_n)) \log \frac{p(W | (V_1, \ldots, V_n))}{\hat{p}(W | (V_1, \ldots, V_n))} dW.$$

The KL divergence is computable since $p(W|(V_1, \ldots, V_n))$ can be represented by Gaussians and the Markov-chain will visit each significant solution over time. After each step, a new solution is obtained, and the set S is augmented to $S_+$ by adding the new solution (or solutions) to the set. Then, one or more solutions are eliminated from the set to obtain the new $S_{new}$ by minimizing the KL divergence $\hat{D}(p_+\|p_{new})$. Multiple Markov-chains can be run and new solutions can be added to S in a batch fashion.

Figure 2:
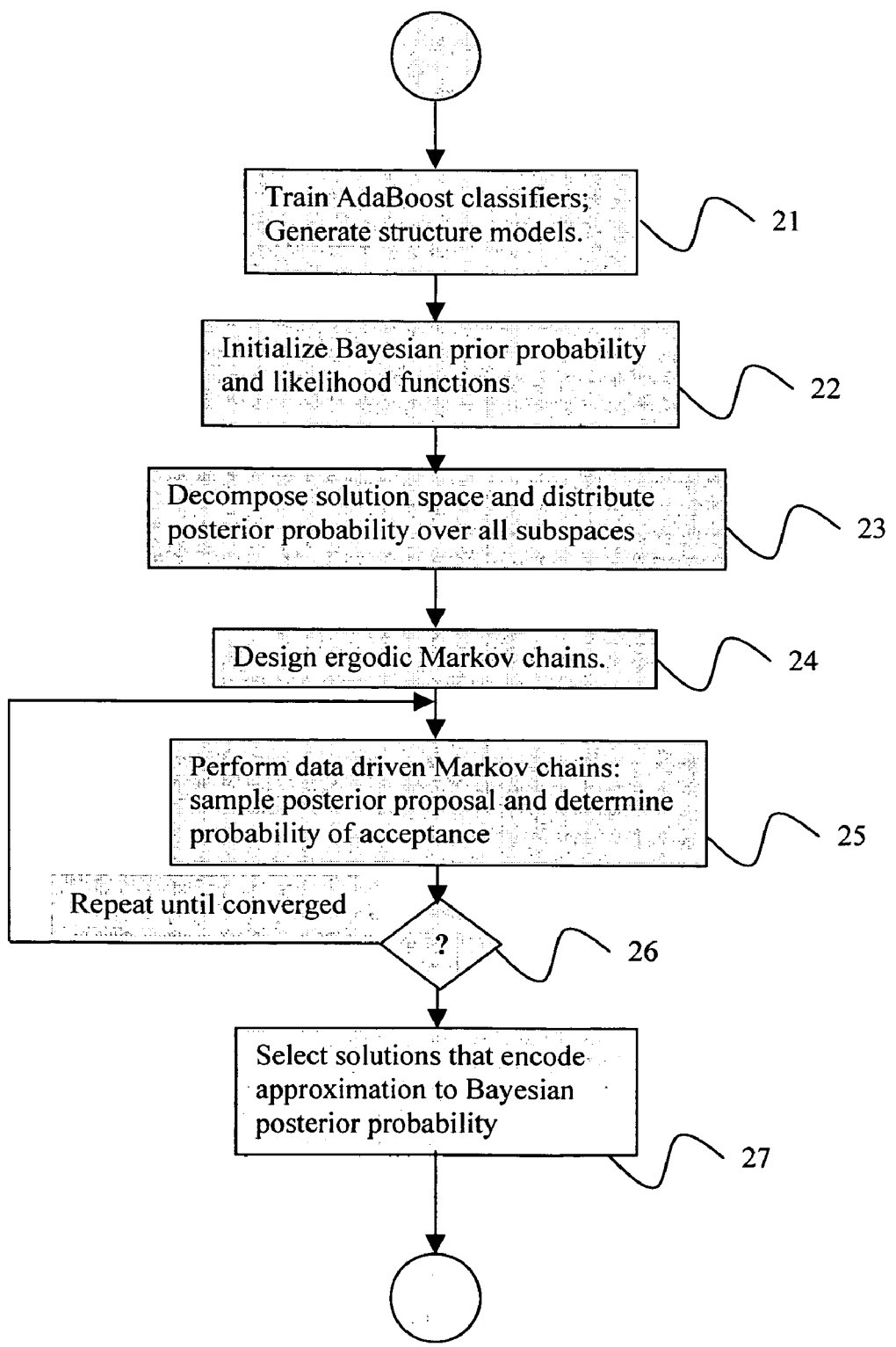
FIG. 2 is a flow chart of an anatomical parsing process, according to an embodiment of the invention.

FIG. 2 presents a flow chart of an anatomical parsing process according to an embodiment of the invention. At step 21, the AdaBoost classifiers are trained, and the generative structure models are defined as described above. At step 22, the Bayesian prior probability and likelihood functions are initialized in terms of the generative models being used to model the structures and objects of interest. The solution space of the Bayesian posterior probability is decomposed into a set of subspaces at step 23, and the posterior probability is distributed over all subspaces. Ergodic Markov chains are designed at step 24 to sample the posterior probability subspaces. These chains comprise the jump dynamics and diffusion dynamics described above. At step 25, data driven techniques comprising the conditional AdaBoost classifiers are used to drive the Markov-chain sampling. In the case of occluded objects, the techniques for incorporating occlusion described above are used in computing the integral image. Each posterior proposal is sampled from $q(W \mapsto W'|(V_1, \ldots, V_n))$ and are accepted with probability $\alpha(W \mapsto W')$ as described above. The sampling is repeated at step 26 for multiple posterior probabilities until a set of solutions have converged, and at step 27, the solution set is pruned to select a subset of solutions that encode an approximation to the Bayesian posterior probability. The solutions are computed to minimize a Kullback-Leibler divergence from the approximate posterior to the true posterior. The selection and pruning comprise a minimizing the KL divergence as described above.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 3:
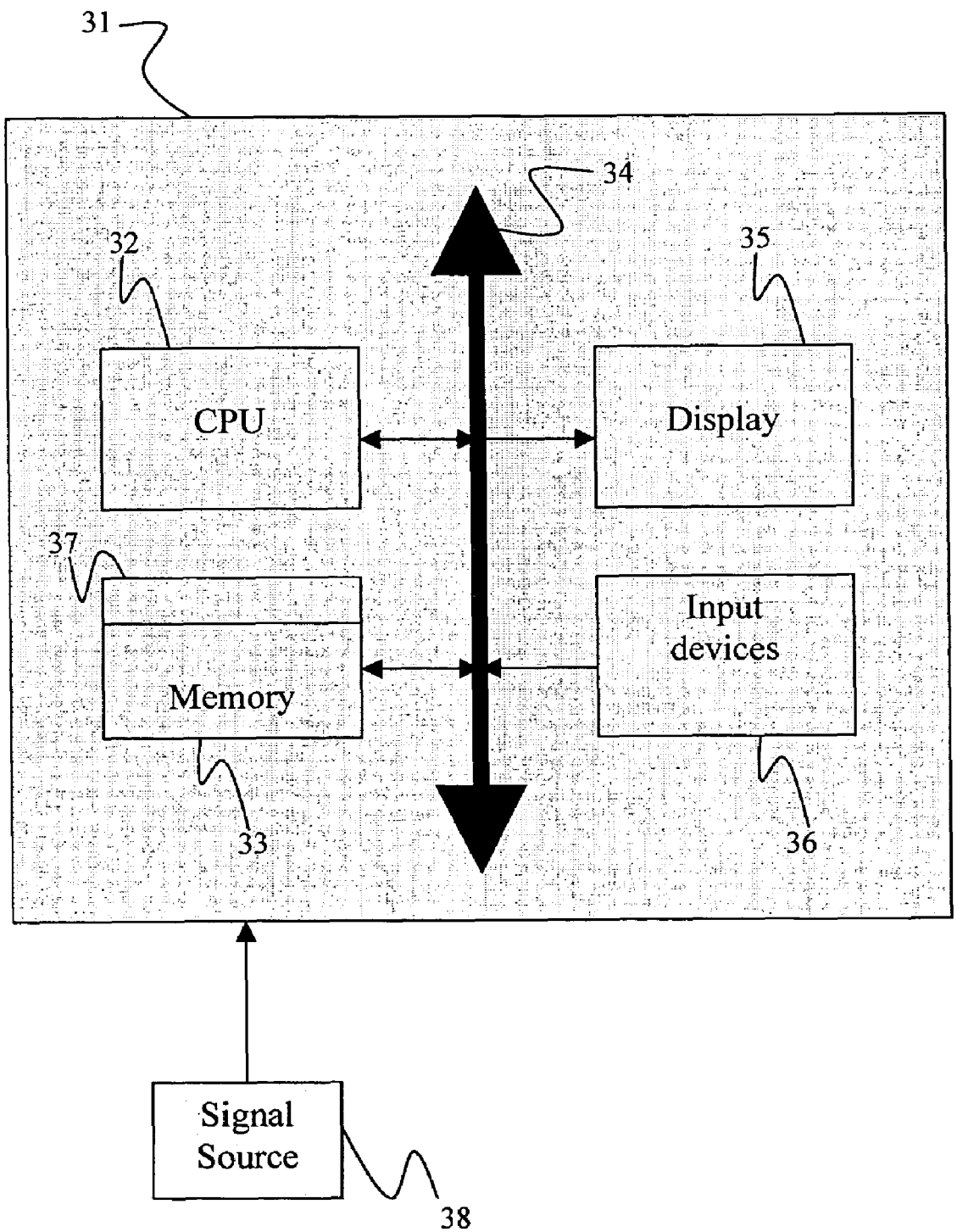
FIG. 3 is a block diagram of an exemplary computer system for implementing an anatomical parsing process, according to an embodiment of the invention.

FIG. 3 is a block diagram of an exemplary computer system for implementing an anatomical structure parsing system according to an embodiment of the invention. Referring now to FIG. 3, a computer system 31 for implementing the present invention can comprise, inter alia, a central processing unit (CPU) 32, a memory 33 and an input/output (I/O) interface 34. The computer system 31 is generally coupled through the I/O interface 34 to a display 35 and various input devices 36 such as a mouse and a keyboard. The support circuits can include circuits such as cache, power supplies, clock circuits, and a communication bus. The memory 33 can include random access memory (RAM), read only memory (ROM), disk drive, tape drive, etc., or a combinations thereof. The present invention can be implemented as a routine 37 that is stored in memory 33 and executed by the CPU 32 to process the signal from the signal source 38. As such, the computer system 31 is a general purpose computer system that becomes a specific purpose computer system when executing the routine 37 of the present invention.

The computer system 31 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of segmenting a digitized image comprising the steps of:
providing a digitized image comprising a plurality of intensities defined on a lattice of pixels;
initializing a Bayesian prior probability and likelihood function for segmenting said image;
decomposing said image into a union of a plurality of subspaces wherein each subspace is a product of k-partitions, and distributing a plurality Bayesian posterior probability functions over said subspaces;
updating said Bayesian posterior probability functions via a data-driven Markov-chain; and
selecting a subset of said Bayesian posterior probability functions that approximate a true Bayesian posterior probability function.

2. The method of claim 1, wherein updating said Bayesian posterior probability functions further comprises sampling moves from a proposal probability and accepting moves based on a proposal likelihood probability function.

3. The method of claim 1, wherein said Markov-chain comprises jump moves and diffusion processes.

4. The method of claim 1, wherein said data-driven Markov-chain combines bottom-up proposals and top-down generative models to guide the updating of the posterior probability function.

5. The method of claim 4, wherein the bottom proposals are derived from an AdaBoost classifier algorithm.

6. The method of claim 5, wherein the AdaBoost algorithm outputs a conditional probability.

7. The method of claim 5, wherein the generative models are based on models using parameters estimated from training said AdaBoost classifiers.

8. The method of claim 1, further comprising computing an integral volume from said image to compute Haar type features.

9. The method of claim 5, wherein said AdaBoost classifier uses DOG and DOOG filters to define features.

10. The method of claim 1, further comprising using an occlusion mask to correct a feature value for an occluded feature, wherein said occlusion mask excludes invalid pixels from a feature value calculation.

11. A program storage device readable by a computer, tangibly embodying a program of instructions executable by the computer to perform the method steps for segmenting a digitized image, said method comprising the steps of:
providing a digitized image comprising a plurality of intensities defined on a lattice of pixels;
initializing a Bayesian prior probability and likelihood function for segmenting said image;
decomposing said image into a union of a plurality of subspaces wherein each subspace is a product of k-partitions, and distributing a plurality Bayesian posterior probability functions over said subspaces;
updating said Bayesian posterior probability functions via a data-driven Markov-chain; and
selecting a subset of said Bayesian posterior probability functions that approximate a true Bayesian posterior probability function.

12. The computer readable program storage device of claim 11, wherein updating said Bayesian posterior probability functions further comprises sampling moves from a proposal probability and accepting moves based on a proposal likelihood probability function.

13. The computer readable program storage device of claim 11, wherein said Markov-chain comprises jump moves and diffusion processes.

14. The computer readable program storage device of claim 11, wherein said data-driven Markov-chain combines bottom-up proposals and top-down generative models to guide the updating of the posterior probability function.

15. The computer readable program storage device of claim 14, wherein the bottom proposals are derived from an AdaBoost classifier algorithm.

16. The computer readable program storage device of claim 15, wherein the AdaBoost algorithm outputs a conditional probability.

17. The computer readable program storage device of claim 15, wherein the generative models are based on models using parameters estimated from training said AdaBoost classifiers.

18. The computer readable program storage device of claim 11, further comprising computing an integral volume from said image to compute Haar type features.

19. The computer readable program storage device of claim 15, wherein said AdaBoost classifier uses DOG and DOOG filters to define features.

20. The computer readable program storage device of claim 11, further comprising using an occlusion mask to correct a feature value for an occluded feature, wherein said occlusion mask excludes invalid pixels from a feature value calculation.

21. A method of segmenting a digitized image comprising the steps of:
providing a digitized image comprising a plurality of intensities defined on a lattice of pixels;
training an AdaBoost classifier that outputs conditional probabilities, and using parameters estimated from said training to define generative models for structures sought to be segmented;

using a data-driven Markov-chain to estimate a plurality of Bayesian posterior probability functions that segment said image, wherein said Markov-chain combines proposals derived from said AdaBoost classifier and said generative models to guide the updating of the posterior probability functions; and selecting a subset of said Bayesian posterior probability functions that approximate a true Bayesian posterior probability function for the image segmentation.

22. The method of claim 21, wherein said Markov-chain is ergodic.

23. The method of claim 21, wherein selecting a subset of said Bayesian posterior probability functions further comprises seeking those functions that minimize a Kullback-Leibler divergence from said approximate posterior probability to a true posterior probability function.

* * * * *